Nov. 21, 1939.   H. F. DICKINSON   2,180,731
COMBINED POWER AND COMMUNICATION CABLE
Filed March 27, 1937
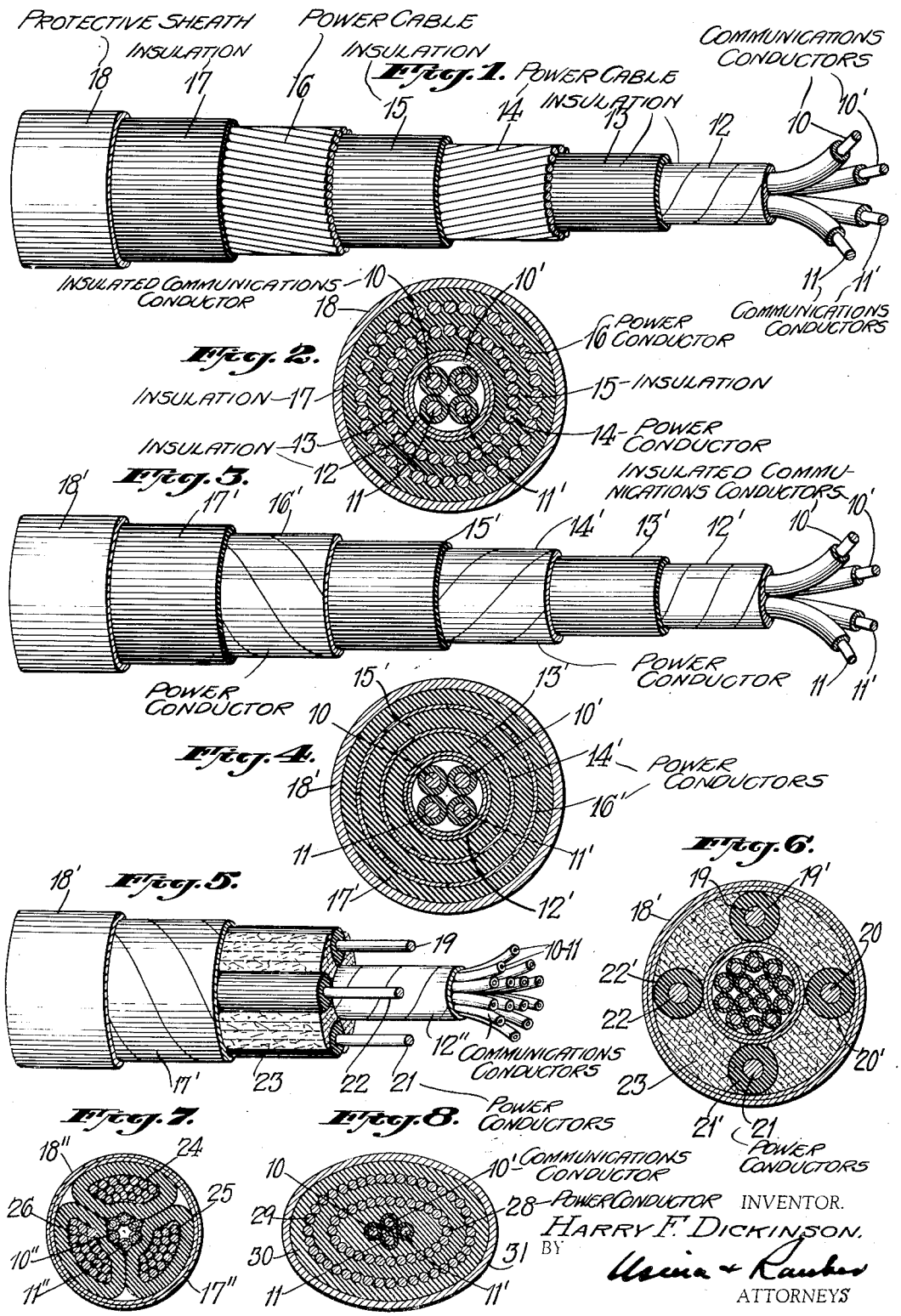

Patented Nov. 21, 1939

2,180,731

UNITED STATES PATENT OFFICE 2,180,731

COMBINED POWER AND COMMUNICATION CABLE

Harry F. Dickinson, Yonkers, N. Y., assignor to Anaconda Wire & Cable Company, New York, N. Y., a corporation of Delaware Application March 27, 1937, Serial No. 133,373

4 Claims. (Cl. 174—105)

This invention relates to a combined power and communication cable.

When insulated electric power conductors are combined with insulated communication conductors within a common sheath, experience in the past, has proven that interference currents are induced in the communication conductors to such an extent that the signals being transmitted are distorted, if not rendered completely unintelligible. The use of metallic shielding tapes or shielding braids around either the communication conductors or the power conductors or both has offered very little effectiveness in reducing these interference currents.

In accordance with the present invention, the difficulty referred to is overcome by positioning the communication conductors in the center of the area of a cable section and arranging the power conductors symmetrically or concentrically about them.

The invention takes into consideration the fact that at the geometric center of the internal section within a concentric conductor, the effective electric field is zero. When this fact is taken into consideration, it is apparent that there is a true and novel cooperative relationship between the communication and power conductors, as the satisfactory operation of the communication conductors is dependent upon the symmetrical relation of the power conductors, so as to prevent distortion of voice modulated currents transmitted, by said communication conductors.

The power conductors in the cable considered are applicable to any type of wiring circuit, i. e., single phase or polyphase, and alternating or direct current.

The combined power and communication cable of my invention has a wide field of application for submarine, aerial, and buried installations, since the possibility of combining two types of cable within a common sheath effects economy in the cost of cable and the space utilized for installation. (For the same quality of service as provided by this invention, it was formerly required to use two separate cables, each having its own protective covering, which in the cases of installation outlined above involves metallic armoring which is an expensive operation in cable manufacturing.) The installation cost is also less for the single cable.

An example of an installation requiring the use of a cable design as covered by my invention is in a mine shaft where power and communication circuits must be brought down from the surface of the mine to the various underground levels. A cable for this service must be protected with metallic armor against abrasion and impact, and the available space in the mine shaft for cable installation is usually limited. The cable design covered by my invention will provide a single cable, having an economic cost and space advantage with greater protection against electromagnetic and electrostatic interference in the communication conductors, as caused by the power conductors, than could be accomplished otherwise.

Several alternative embodiments of the invention are exemplified in the accompanying drawing, in which—

Fig. 1 is a perspective elevation with portions of the cable broken through different distances to reveal the interior construction; Fig. 2 is a cross-sectional view thereof; Fig. 3 is a view similar to Fig. 1, illustrating a modification; Fig. 4 is a cross-section thereof; Fig. 5 is an elevation partly broken away to illustrate a further elevation; Fig. 6 is a cross-section thereof; Figs. 7 and 8 are cross-sectional views of further modifications.

Referring in detail to the drawing, 10 and 10' illustrated one pair of communication conductors, such as telephone wires adapted to transmit voice and modulated currents. 11 and 11' represent another pair of similar communication conductors. These are individually provided with any suitable form of insulation commonly used in the art and are surrounded, as shown, by a wrapping or binder 12 and insulation 13. Cabled concentrically about the body of insulation 13, there is a power transmission conductor 14. The strands composing this conductor, as clearly shown in Fig. 2, are arranged concentrically about the central longitudinal axis of the cable as a whole and the communication conductors are also arranged concentrically about said axis. Surrounding the power cable 14, there is a body of insulation 15. Outside of this, there is a plurality of circularly arranged strands, which comprise another power cable 16. These strands, as clearly shown in Fig. 2, are circularly arranged and are concentric with the longitudinal axis of the cable. Outside of the cable 16, there is a body of insulation 17, as described hereinbefore and an outer protective sheath 18, which may consist of metallic armoring or any other type of protective covering known in the art.

In the modification of Fig. 3, the communication conductors are substantially the same as in Fig. 1 and they are correspondingly numbered.

They are similarly covered with a wrapping or binder 12' and a layer of insulation 13'. In this modification, one of the power cables is in the form of a ribbon-like strip, indicated at 14'. This is surrounded by a body of insulation 15' over which there is laid another power conductor in the form of a similar ribbon-like strip, indicated at 16'. Outside of the strip 16', there is a body of insulation 17' and an outer protective sheath 18'. As clearly shown in Fig. 4, the power cables 14' and 16' are arranged concentrically about the axis of the inner group of communication conductors.

In the modification of Figs. 5 and 6, I have shown a multiplicity of communication conductors located centrally of the cable as a whole. These are indicated generally by reference character 10—11. This group of communication conductors are symmetrically arranged about the central longitudinal axis of the cable. They are surrounded by a wrapping or binder 12". Arranged symmetrically about the communication cables, there are a plurality of power conductors, indicated at 19, 20, 21 and 22. Each of these conductors is surrounded with a body of insulation 19', 20', 21', 22', as shown and between the insulated power cables there is suitable filling material indicated at 23. Surrounding conductors 19, 20, 21 and 22 and filler 23, there is a wrapping or binder 17' and an outer protective sheath 18'.

In the modification of Fig. 7, I have shown a central group of communication conductors 10" and 11". Arranged symmetrically about this group of conductors are three power conductor cable units 24, 25 and 26, each unit being of the sector type and being surrounded with the conventional form of insulation, the entire assemblage being enclosed in a wrapping or binder 17" and an outer protective sheath 18".

In the modification of Fig. 8, the central group of communication conductors 10, 10', 11 and 11' are symmetrically grouped about the central longitudinal axis of a cable which is of substantially elliptical shape in cross-section. In this modification, there is an inner power transmission cable comprised of a plurality of elliptically arranged strands 28, which are symmetrically arranged about the central longitudinal axis of the cable as a whole. Spaced away from the power cable 28 by a suitable body of insulation, there is another power cable 29, the individual conductors or strands of which are also symmetrically arranged about the central longitudinal axis of the cable as a whole. There is a body of insulation 30 surrounding the outer power cable 29 and the entire assemblage is enclosed in an elliptical protective sheath 31.

In all of the cases illustrated, the communication conductors may be twisted together and enclosed within one or more conductors adapted to carry power transmission currents, the power conductors being in the form of a plurality of concentric strands of copper, or other suitable conducting material arranged symmetrically about the center of the inner group of communication conductors. By such a symmetrical or concentric arrangement of the respective communication and power conductors, the voice modulated currents transmitted by said communication conductors will not be distorted by the power currents transmitted by the power conductors.

Various modifications may be made by those skilled in the art without departure from the invention as defined in the appended claims.

What I claim is:

1. A modulated communication circuit and a power transmititng circuit comprising a cable having an inner group of insulated conductors for transmitting modulated currents of said communication circuit and an electric power transmission circuit comprising a plurality of outer power current conductors to conduct alternating currents of said power transmitting circuit and arranged symmetrically about said inner group of conductors to provide a zero electric field at said inner group of conductors and to prevent distortion of the currents transmitted by said inner group of conductors.

2. A modulated communication circuit and a power transmitting circuit comprising a cable having an inner group of insulated conductors transmitting modulated communication currents of said communications circuit and arranged symmetrically in pairs about a central longitudinal axis and a plurality of electric power conductors to conduct alternating currents of said power transmitting circuit and arranged concentrically about said axis and with intervening insulation between said power conductors and said inner group of conductors, said electric power conductors being arranged to provide a zero electric field in the area of said inner modulated communication conductors and to prevent distortion of the currents transmitted by said inner group of conductors.

3. A telephone circuit and a power circuit comprising a cable having an inner group of individually insulated conductors transmitting voice modulated currents of said telephone circuit and an electric power transmission circuit comprising a plurality of power conductors to conduct alternating currents of said power circuits insulated from one another and arranged concentrically and symmetrically about the inner group of conductors of said telephone circuit to provide a zero electric field within said inner group of telephone conductors.

4. A telephone circuit and a power circuit comprising a cable having an inner group of individually insulated telephone circuit conductors to transmit voice modulated currents, a circular body of insulation surrounding the latter and a plurality of circularly arranged power conductors to conduct alternating electric power currents, said conductors being coaxially positioned with one another and centered about and enclosing said inner group of insulated telephone conductors to provide a zero electric field at said inner group of conductors and insulation separating the power conductors from one another.

HARRY F. DICKINSON.